May 20, 1958
J. T. ANDERSON
2,835,414
MILK CARTON PITCHER
Filed July 11, 1955
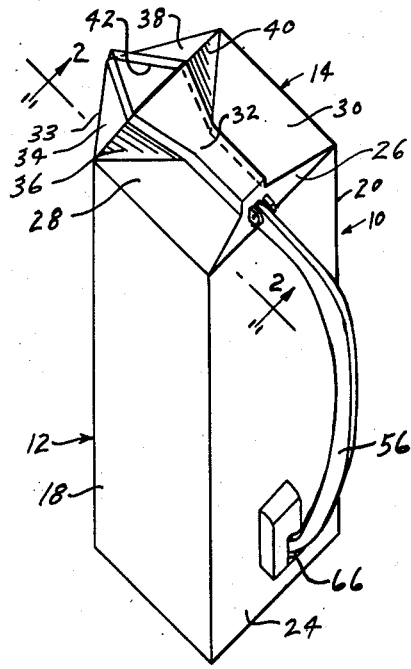
Fig. 1.
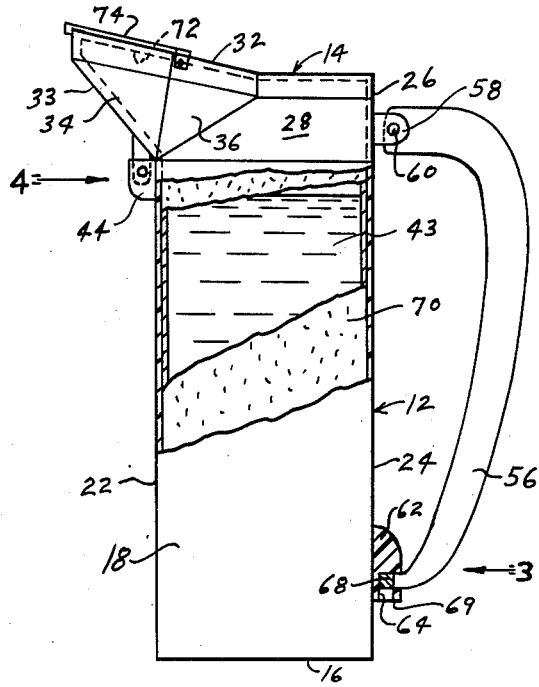
Fig. 2.
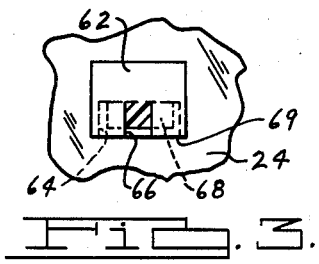
Fig. 3.
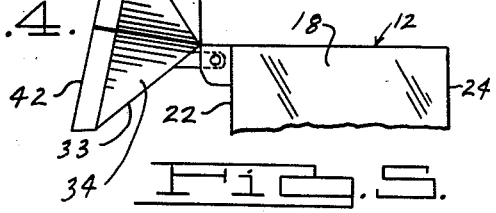
Fig. 5.
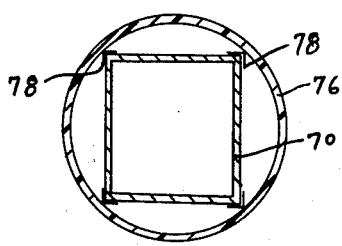
Fig. 6.
Fig. 4.
INVENTOR.
JOHN T. ANDERSON
BY
Robert D. Menteg
ATTORNEY United States Patent Office 2,835,414
Patented May 20, 1958

2,835,414

MILK CARTON PITCHER

John T. Anderson, Detroit, Mich.

Application July 11, 1955, Serial No. 521,057

4 Claims. (Cl. 222—183)

This invention relates to a milk carton pitcher, and, more particularly, to a pitcher adapted to receive and hold conventional paper milk containers. At the present time, it is common practice in the milk industry to package milk in a paper carton or container having an upper end adapted to be unfolded into a spout for pouring the milk. The spout on these containers must be folded and unfolded for each instance of use, and, in the course of doing so, the spout is damaged in many cases. Furthermore, it is difficult to handle these paper milk containers, since they are waxed and become slippery due to the moisture which condenses on them, due to the change in the surrounding temperature when they are taken from a refrigerating unit. Accordingly, it is an important object of this invention to provide a milk carton pitcher which is adapted to receive and hold a conventional type paper milk container, so as to make the handling of said milk container much easier and safer for the user, and, at the same time, provide a decorative and sanitary pitcher in which the milk carton may be quickly and easily installed, and replaced when required.

It is another object of this invention to provide a novel milk carton pitcher adapted to keep the milk clean and fresh and, in which the milk is adapted to be held in the sterilized packaged container in which it is packaged at the dairy.

It is still another object of this invention to provide a combination pitcher and container for paper milk containers.

It is a further object of this invention to provide a milk carton pitcher of this class which will be simple of structure, economical of manufacture, durable, compact and highly efficient in use.

It is a still further object of this invention to provide a milk carton pitcher of this class which comprises, a lower part adapted to form a receptacle which is open on its upper end so as to receive and hold a paper milk carton, an upper part hingedly connected to said lower part and which is shaped in accordance with the top of the opened paper milk carton, and, a handle means on said pitcher.

It is a further object of the present invention to provide a milk carton pitcher adapted to accommodate a paper milk container as a whole so as to enclose and conceal it.

Other objects, features and advantages of this invention will be apparent from the following detailed description and appended claims, reference being had to the accompanying drawing forming a part of the specification wherein like reference numerals designate corresponding parts of the several views.

In the drawings:

Fig. 1 is a perspective view of an illustrative embodiment of the invention:

Fig. 2 is an elevational view of the structure illustrated in Fig. 1, taken along the line 2—2 thereof, and showing such structure partially in section;

Fig. 3 is a fragmentary elevational view, partly in section, of the structure illustrated in Fig. 2, taken along the line 3—3 thereof;

Fig. 4 is a fragmentary elevational view of the structure illustrated in Fig. 2, taken in the direction of the arrow marked 4;

Fig. 5 is a partial side elevational view of the structure illustrated in Fig. 1, showing the novel milk carton pitcher in an opened position, ready for insertion of the paper milk container; and, Fig. 6 is a horizontal cross-sectional view of a modified milk carton pitcher made in accordance with the principles of the invention.

Before explaining in detail the present invention, it is to be understood, that the invention is not limited in its application to the details of construction and arrangement of parts illustrated in the accompanying drawing, since the invention is capable of other embodiments and of being practiced or carried out in various ways. Also, it is to be understood, that the phraseology and terminology employed herein is for the purpose of description and not limitation.

It will be obvious that the milk carton pitcher of the present invention is especially adapted for use with a paper milk carton now in use on the market, in which the upper end of the carton or container is fastened together along a central, upwardly extending ridge, and in which half of said ridge is adapted to be unfolded into a pouring spout.

In the drawings, the numeral 10 designates an illustrative embodiment of the invention comprising a lower part 12 and a hingedly mounted top part 14. The lower part 12 includes a bottom wall 16, integral side walls 18 and 20, and, integral front and rear side walls 22 and 24, respectively. It will be seen, that the lower box-like part 12 is tubular in shape, being open at the top and square in cross-section. The bottom part 12 is shaped in accordance with the cross-section of the paper milk container which it is to receive, and, is substantially as high as the body part of said paper milk container.

The pitcher upper part 14 is adapted to function as a cover and spout for the paper milk container, and, is shaped in accordance with the top of the milk container, and to the form that the milk container assumes when it is open for pouring. The pitcher top portion 14 comprises a vertical rear part 26, a pair of upwardly and inwardly sloping side parts 28 and 30, and, a top rearwardly sloping part 32 which is integral with the aforementioned top parts. The front part of the pitcher upper part 14 comprises five sloping wall parts which are adapted to form a spout, namely, parts 33, 34, 36, 38 and 40, all integrally joined to the top parts. The spout parts 33, 34, 36, 38 and 40 are joined with the upper sloping part 32 so as to leave a triangular opening 42 therebetween, through which the milk 43 may be poured.

The upper part 14 of the pitcher is hingedly mounted on the lower part, at the front side thereof. As is best seen in Figs. 2 and 4, the pitcher lower part 12 is provided with a pair of centrally disposed, spaced apart, outwardly extending arms 44 on the upper end of the front wall 22, which arms are each provided with a horizontal aperture 46 therethrough. The pitcher top part 33 is provided with a centrally disposed, downwardly extending arm 48 on the front side thereof, which is adapted to be positioned between the arms 44, and, which arm 48 is provided with a horizontal aperture 50. A suitable metal or plastic shaft 52 is adapted to pass through the apertures 46 and 50, whereby the arm 48 will be hingedly connected to the pitcher lower part 12. The ends of the shaft 52 may be provided with suitable heads, as at 54, so as to hold the shaft 52 in place.

The milk carton pitcher 10 is provided with a handle 56, which is hingedly connected to the pitcher top part 26, and, detachably connected to the pitcher lower part 12 on the lower end of the rear wall 24. As best seen in Fig. 1, the pitcher upper part 26 is provided with a pair of outwardly extending, spaced apart arms 58, between which the upper end of the handle 56 is disposed. A suitable metal or plastic shaft 60 is adapted to pass through suitable apertures in the arms 58, and in the upper end of the handle 56. The shaft 60 may be retained in place by any suitable means. As is seen in Figs. 1 and 3, the rear wall 24 of the pitcher lower part 12 is provided with an outwardly extending lug or projection 62, which is provided with a vertically disposed, longitudinal slot 64, extending inwardly and upwardly from the lower edge of the lug. The front side of the projection 62 is provided with a vertically disposed, inwardly extending slot 66, which communicates with the vertical slot 64. The slots 64 and 66 coact to form a T-slot in the lower end of the lug 62. The lower end of the handle 56 is provided with a cross member 68, which forms a T-shaped end on said handle. It will be seen, that the horizontal cross piece 68, on the handle 56, is adapted to be sprung downwardly, below the lower edge 69 of the projection 62, and then inwardly and upwardly into the slot 64, so as to hold the lower end of the handle 56 securely, but releasably, in place.

The lower and upper pitcher parts 12 and 14, and, the handle 56, are preferably made from any suitable plastic material, and the like, but they may also be made from a suitable lightweight metal, as aluminum.

In the practice of the invention, assuming that the pitcher 10 is in the assembled condition, the handle 56 would be flexed or sprung inwardly, toward the rear wall 24, so as to permit the cross part 68 to be moved downwardly and snapped out of the cross slot 64. The pitcher top part 14 may then be pivoted upwardly, together with the handle 56, about the shaft 52, so as to swing the top part 14 clear of the lower part 12. Fig. 5 shows the top part 14 in a partially opened position. The paper milk carton or container 70 may be inserted downwardly into the lower part 12 of the pitcher after the top part 14 is clear of the lower part 12. The paper milk container 70 is assembled into the lower part 12 with the container spout part 72 open, and, then, the upper pitcher part 14 is pivoted around the shaft 52 and the cross piece 68, on the handle 56 is then snapped into position in the slots 64 and 66, in the projection 62. The loaded milk pitcher 10 is then ready for use, in the usual manner, and the milk held in the paper container 70 may be poured outwardly through the opening 42 in the pitcher spout. The milk carton pitcher 10 may be placed in a refrigerator, or other cooling apparatus, without reclosing the paper spout 72, or, if desired, the upper pitcher part 14 may be opened in the manner hereinbefore described, and, the paper container spout 72 may be closed before returning the pitcher to the refrigerator. If desired, a cover member 74, as shown in Fig. 2, could be provided for the spout opening 42.

Fig. 6 shows a cross-sectional view of a milk carton pitcher made in accordance with the invention, in which the lower part 76 is circular in cross-sectional shape. If the circularly shaped pitcher lower part 76 is used, a plurality of vertically disposed positioning means, or ribs, 78 may be provided inside the part 76, so as to hold the body part of the paper milk container 70 in the proper position.

It will be obvious that the pitcher lower part 12 may be made so as to have any desired cross-sectional shape, and, that the top part 14 may be formed accordingly.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. A milk carton pitcher of the class described, comprising: a box-like part which is substantially rectangular in shape and open on the upper end thereof; a cover hingedly mounted on said box-like part along the front side therof; said cover being formed with a pouring spout on the front side thereof; a handle on said pitcher; the upper end of said handle being hingedly connected to the rearward side of said cover; and, the lower end of said handle being releasably connected to the box-like part.

2. A milk carton pitcher of the class described, comprising: a body portion having a bottom wall, side walls, a front and back wall, and, being open on the upper end thereof to receive a paper milk container having a pouring spout; a cover shaped complementary to the upper end of said container and enclosing the open end of said body portion; said cover being hingedly connected to the front wall of said body portion; a pouring spout on said cover adapted to seat over the pouring spout on the paper milk container; and a handle on the pitcher having one end hingedly mounted on said cover and the other end detachably connected to said body portion.

3. A milk carton pitcher of the class described, comprising: a box-like part which is substantially rectangular in shape and open on the upper end thereof; a cover hingedly mounted on said box-like part; said cover being formed with a pouring spout on the front side thereof; a handle on said pitcher; the upper end of said handle being hingedly connected to the rearward side of said cover; said box-like part being provided with a projection on the lower part of the rear wall thereof; said projection being provided with a T-slot, and the lower end of said handle being provided with a T-shaped portion adapted to be releasably engaged in said T-slot in said projection.

4. A milk carton pitcher of the class described, comprising: a body portion having a bottom wall, side walls, a front and back wall, and, being open on the upper end thereof to receive a paper milk container having a pouring spout; a cover enclosing the open end of said body portion; said cover being hingedly connected to said body portion; a pouring spout on said cover adapted to seat over the pouring spout on the paper milk container; and, a handle on the pitcher having the upper end thereof hingedly mounted on said cover and the lower end thereof detachably connected to the body portion by means of a cross-head on the lower end of the handle engaging a complementary cross-slot in a projection on said body portion.

References Cited in the file of this patent

UNITED STATES PATENTS

| | | |
|---|---|---|
| 1,216,180 | Stuewe | Feb. 13, 1917 |
| 1,280,501 | Lewis | Oct. 1, 1918 |
| 1,960,152 | Grundhand et al. | May 22, 1934 |
| 2,025,796 | Waldheim | Dec. 31, 1935 |
| 2,110,697 | Buschman | Mar. 8, 1938 |
| 2,612,765 | Gorey | Oct. 7, 1952 |
| 2,657,828 | Crippen | Nov. 3, 1953 |